United States Patent [19]
Reese et al.

[11] Patent Number: 5,839,610
[45] Date of Patent: Nov. 24, 1998

[54] INGREDIENT MIXING BOWL AND MOISTURE REDUCTION SYSTEM FOR A VENDING MACHINE

[75] Inventors: Robert J. Reese, St. Charles; Franklin D. Newkirk, Florissant, both of Mo.

[73] Assignee: Crane Co., Stamford, Conn.

[21] Appl. No.: 949,573

[22] Filed: Oct. 14, 1997

[51] Int. Cl.$^6$ .............................. B67D 5/56; B67D 83/00
[52] U.S. Cl. .................................. 222/129.3; 222/129.4; 222/136; 222/145.5; 222/459
[58] Field of Search .............................. 222/129.3, 129.4, 222/145.5, 136, 459

[56] References Cited

U.S. PATENT DOCUMENTS

| | | | |
|---|---|---|---|
| 1,092,376 | 11/1914 | Ditchburn et al. | 222/129.3 |
| 3,385,569 | 5/1968 | Bookout | 222/129.4 |
| 3,709,408 | 1/1973 | Syverson | 222/129.4 |
| 4,194,651 | 3/1980 | Martin et al. | 222/129.4 |
| 5,192,002 | 3/1993 | Reese et al. | 222/129.4 |
| 5,344,050 | 9/1994 | Ficken | 222/129.4 |

*Primary Examiner*—Andres Kashnikow
*Assistant Examiner*—Keats Quinalty
*Attorney, Agent, or Firm*—Senniger, Powers, Leavitt & Roedel

[57] ABSTRACT

An ingredient mixing apparatus and moisture reduction system for a liquid vending machine which is capable of mixing a predetermined portion of dry ingredient with a liquid and vending the resultant mixture. The ingredient mixing apparatus includes a mixing bowl which has a cylindrical upper portion and conical lower portion with an outlet spout at the bottom. The liquid is injected into the bowl at a tangent so that it swirls about the bowl for mixing. The dry ingredient is dropped into the top of the bowl simultaneously with the liquid injection so that the two mix before leaving the bowl through the bottom. A top cap is provided for the mixing bowl with a depending wall extending adjacent the inner cylindrical surface of a portion of the bowl. A divider wall also supported by the cap extends down into the mixing bowl to divide it into two sections. Suction is provided on the second section to remove steam or vapor and airborne dry ingredient from the bowl. The moisture reduction system includes a series of mixing bowls and a manifold that removes the steam and dry ingredient from the mixing bowls.

13 Claims, 4 Drawing Sheets

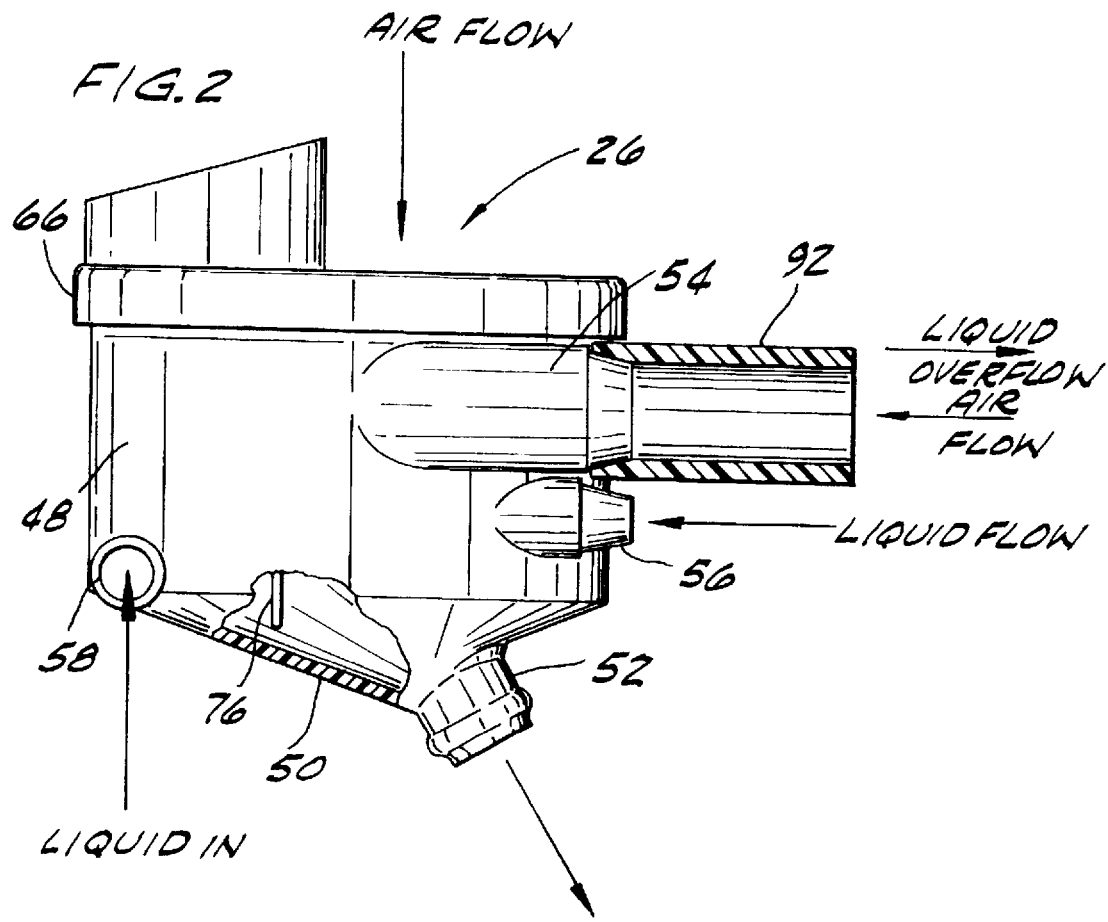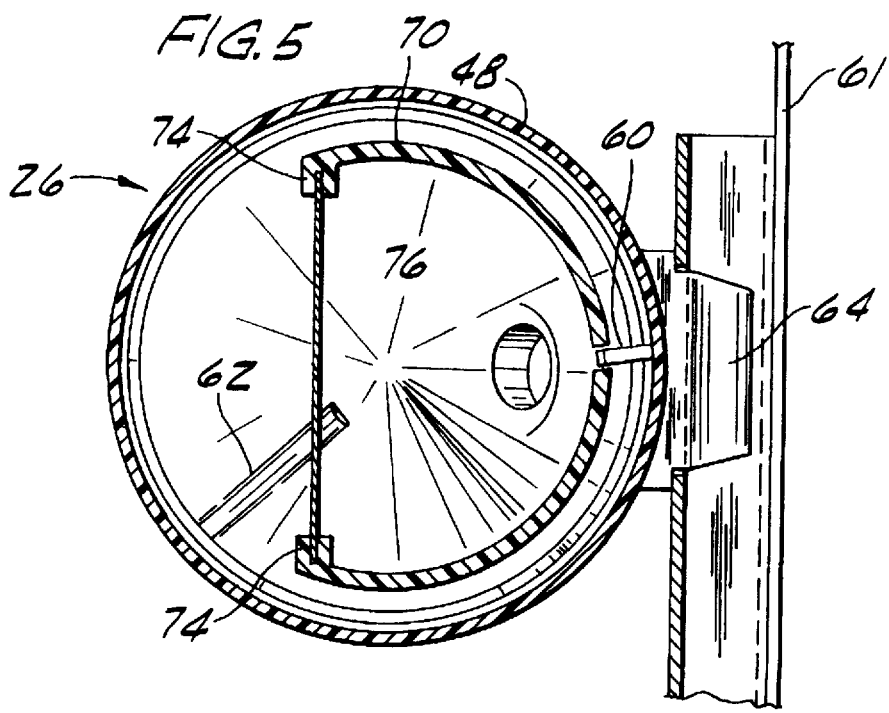

5,839,610

INGREDIENT MIXING BOWL AND MOISTURE REDUCTION SYSTEM FOR A VENDING MACHINE

BACKGROUND OF THE INVENTION

The present invention relates to vending machines and, more particularly, to a system for mixing dry ingredients with liquids prior to their being dispensed by the vending machine and reducing the vapor and airborne ingredients from escaping the mixing bowl into the inside of the vending machine.

Vending machines which mix predetermined amounts of dry ingredients and liquids have been known for many years. They are generally provided with some device for mixing the dry ingredients with the liquids in premeasured amounts. The resultant mixture is then dispensed from the mixing device to a cup station in the vending machine where it is dispensed into a cup to be removed by a customer. Many such vending machines dispense hot liquids such as coffee and tea mixed with a variety of ingredients such as sugar or powdered creamer. Since the liquid with which the dry ingredient is mixed is usually heated to near the boiling point and thus produces steam or vapor during the mixing process the inside of the vending machine is exposed to high humidity as the steam escapes from the mixing device. Also, since the dry ingredient, often in the form of a fine powder, to be added to the liquid to be mixed is dumped into the mixing device it can become airborne along with the steam or vapor and combine with it to deposit on surfaces of the mixing device and other parts of the vending machine providing potentially unsanitary and difficult to clean conditions.

Also, the airborne ingredients as fine powders, when combined with moisture in the atmosphere, can form large deposits on surfaces of the mixing bowl due to static attraction thereto and can build up in the mixing bowl if not removed often. This thus requires substantial maintenance of the machines and is undesirable as costly and inefficient.

SUMMARY OF THE INVENTION

The present invention overcomes the above described difficulties and disadvantages associated with prior art devices by providing an ingredient mixing apparatus and moisture reduction system which removes more steam or vapor and airborne ingredient from the mixing bowl than prior art systems and reduces the amount of build up in the mixing apparatus.

It is therefore an object of the present invention to provide an ingredient mixing apparatus for a beverage vending machine that reduces the amount of steam or vapor and airborne ingredient that would otherwise spread through the vending machine and cause unsanitary conditions, damage to the machine and additional cleaning expense.

It is a further object of the present invention to provide an ingredient mixing apparatus for beverage vending machines which includes a mixing bowl having a lower portion with an inner surface formed substantially of a surface of revolution and containing an outlet therein; a substantially vertical divider wall extending into the mixing bowl and having a lower edge in close proximity to the inner surface of the mixing bowl to substantially divide the mixing bowl into first and second sections; means for introducing an ingredient into the mixing bowl on one side of the divider wall in the first section; means for injecting liquid into the mixing bowl so as to cause it to swirl about at least a portion of the inner surface of the mixing bowl and mix with the ingredient before exiting through the outlet; and means for causing a suction on the second section of the mixing bowl so as to remove moisture and ingredient laden air from the mixing bowl during mixing of the liquid and ingredient therein.

It is another object of the present invention to provide an ingredient mixing apparatus for a beverage vending machine, which includes an ingredient mixing bowl having an upper portion and a lower portion, the upper portion having a substantially vertical wall formed of a surface of revolution and the lower portion having a generally conically shaped inner wall with an outlet spout; a divider wall extending into the mixing bowl through the upper and lower portions with side walls extending substantially adjacent the vertical wall of the upper portion, a lower end of the divider wall extending adjacent the conically shaped lower wall so as to substantially divide the bowl into first and second sections without inhibiting the flow of liquid along the conically shaped lower wall; means for injecting a measured amount of liquid into the mixing bowl so as to cause it to circulate about at least a portion of the conically shaped lower wall before entering the outlet spout; means for introducing a measured amount of ingredient into the first section of the mixing bowl so as to mix with the liquid in the mixing bowl and exit the outlet spout therewith; and means for causing a suction on the second section of the mixing bowl so as to remove moisture and ingredient laden air from the mixing bowl during mixing of the liquid and ingredient therein.

It is yet another object of the present invention to provide such an ingredient mixing apparatus wherein the divider wall has an antistatic surface in at least the first section which may, for example, be formed of stainless steel.

It is still another object of the present to provide a moisture reduction apparatus for a liquid vending machine, which includes a plurality of ingredient mixing bowls mounted in the vending machine and having an outlet in a lower portion thereof to remove a mixture therefrom, a substantially vertical wall dividing each bowl into first and second sections with an upper portion of the first section being open to atmosphere and an upper portion of the second section being closed to atmosphere; a suction tube connected to the closed upper portion of the second section of each mixing bowl for withdrawing from the mixing bowl vapor and airborne ingredient; a manifold horizontally mounted in the vending machine and connected to each suction tube; a vacuum source connected to the manifold to supply a source of vacuum to the manifold and suction tubes; and an overflow tube connected to the upper portion of the mixing bowl for removing liquid overflow from the bowl if the mixing bowl outlet becomes clogged.

These and other objects and advantages of the present invention will hereinafter appear and become evident from the description of the preferred embodiment which is provided for illustration purposes and not as a limitation on the scope of the invention.

BRIEF DESCRIPTION OF THE DRAWINGS

FIG. 2 is an enlarged side view of the mixing bowl of the preferred embodiment;

FIG. 5 is a cross-sectional view along line 5—5 of FIG. 4; and

DETAILED DESCRIPTION OF THE PREFERRED EMBODIMENT

Figure 1:
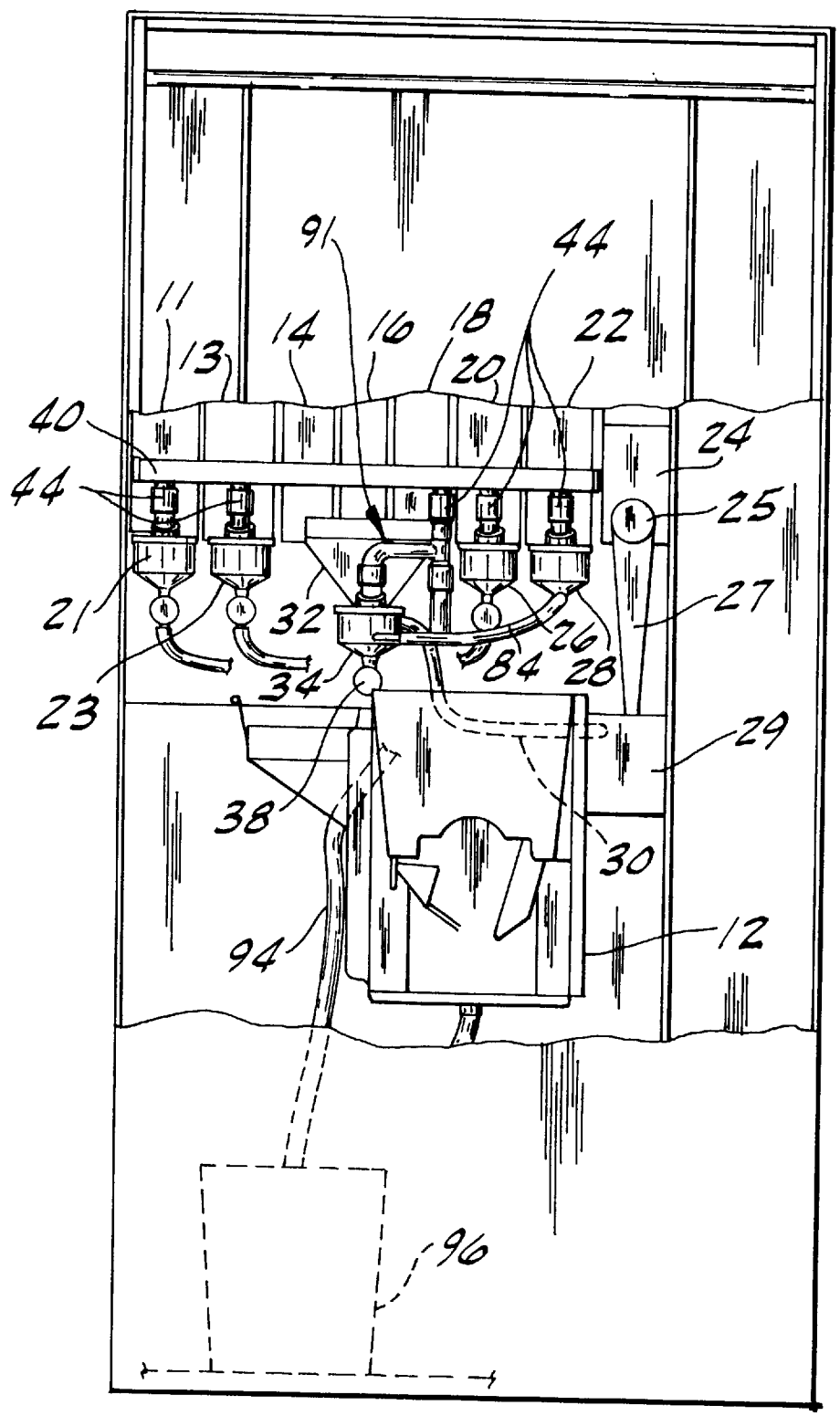
FIG. 1 is a front elevational view of a vending machine with a portion cutaway to show the mixing bowl and moisture reduction system of the preferred embodiment.
Figure 3:
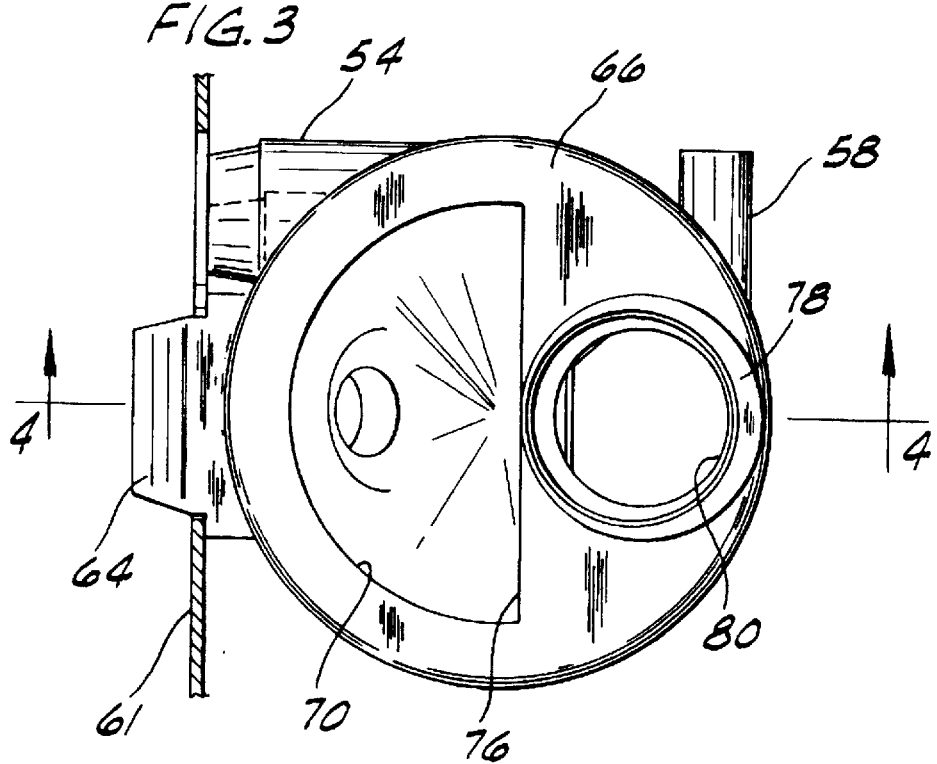
FIG. 3 is a top view of the mixing bowl of FIG. 2.

A beverage vending machine 10 is shown in FIG. 1 and is of the general type to which the present invention pertains in that it is a liquid dispensing type of vending machine from which a customer selects the type of drink that he/she wishes, such as coffee or tea, possibly with creamer or sugar, then the machine through its systems mixes a predetermined amount of dry ingredient with a liquid, such as hot water, and then dispenses the mixture to a cup station 12 where a cup is dropped into position and then the mixture is dispensed into it. The cup station 12 is shown in the cutaway portion of FIG. 1.

In the preferred embodiment, the vending machine 10 is a coffee, hot chocolate, and tea vending machine, although it is contemplated that the systems and apparatus of the present invention could be utilized in other types of liquid dispensing vending machines as well. In the embodiment shown, canisters 11, 13, 14, 16, 18, 20, 22 and 24 are shown mounted at various locations within the vending machine 10 for holding large quantities of dry ingredients, such as powdered milk, sugar, chocolate, powdered creamer, ground tea and coffee, which are dispensed in measured amounts such as by augering or other methods of delivery well known in the art. For example, the three canisters 20, 22, and 24, could respectively be filled with tea, decaffeinated coffee and regular coffee, either previously ground or beans with provision being made such as grinder 25 for grinding the beans. Beneath each of the canisters 20 and 22 is a respective mixing bowl 26 and 28 of the present invention which are mounted to a cross member of the inside of the vending machine 10 and disposed for receiving the measured portion of ingredients from the respective canisters.

Likewise, the canisters 14, 16 and 18, for example, can respectively be filled with sugar substitute, dry creamer and sugar. These three canisters each deposit their premeasured amounts into a common chute 32 which in turn dumps into a further mixing bowl 34. In this arrangement the mixture from one of the mixing bowls 26 or 28 is passed through a supply tube 36 to the mixing bowl 34 where it mixes with one or more of the ingredients from the containers 14, 16 and 18 and is then supplied to the cup station 12. In the case of coffee ground by the grinder 25 from beans stored in canister 24, the ground coffee passes from grinder 25 through a chute 27 to a coffee brewer 29 shown schematically since it forms no part of the present invention. After the coffee is brewed, it is forced from the brewer 29 with compressed air or with a suction type liquid pump through tube 30 and into inlet 56 of mixing bowl 34 where it is then mixed with dry ingredients from canisters 14–18 as desired. Intermediate the mixing bowl 34 and cup station 12 is a whipping assembly 38 which is utilized for some mixtures, such as hot chocolate. The whipping assembly 38 generally utilizes an impeller which is run at high speeds to cause foaming of the mixture prior to its being deposited in a cup in the cup station.

Shown in FIG. 1 above the mixing bowls 21, 23, 26, 28 and 34 is the moisture reduction manifold 40. Suction tubes 44 are connected to each of the mixing bowls 21, 23, 26, 28 and 34, as described in more detail below, for removing steam or vapor and airborne dry ingredient from the mixing bowls. An overflow evacuation system (not shown) is mounted behind the moisture reduction manifold and is attached to each mixing bowl for removing liquid overflow from the upper portion of the mixing bowls if they become clogged.

Referring more particularly to one of the mixing bowls, such as mixing bowl 26, shown in FIGS. 2–5, they are formed with a generally cylindrical portion 48 merging into a lower generally conical portion 50 and terminating in an outlet spout 52. In the upper portion of the cylindrical portion 48 is the overflow outlet 54. Just below outlet 54 is a liquid inlet 56, which in the mixing bowls 21, 23, 26 and 28 is the hot water inlet. Disposed at approximately 90 degrees to liquid inlet 56 is another liquid inlet 58 which in bowl 28 is the inlet for the tea or coffee coming from mixing bowl 28. The overflow outlet 54 and the liquid inlets 56 and 58 are tangent to the walls of the mixing bowl so that in the case of the liquid inlets the liquid is induced to swirl about the inside of the bowls as it enters so as to enhance mixing of the liquid with dry ingredient introduced into the mixing bowl simultaneously with the liquid.

A baffle 60 is formed in the rear inner surface of conical portion 48 and a similar baffle 62 is formed on the inner surface of conical portion 50, both of which are used to disrupt the otherwise spiral flow of the liquid around the inner surfaces of mixing bowl 26 and cause the mixture of liquid and ingredients to pass through exit spout 52.

Molded into the rear of cylindrical portion 48 of each mixing bowl are a plurality of flexible fastening members 64. Corresponding receiving slots are formed in the support plate 61 for easily mounting the mixing bowls in the proper predetermined locations in the vending machine 10.

Forming part of the mixing bowl is an annular cap 66 which is preferably formed of a semi-flexible plastic material that allows the edges 68 of the cap to snap over and lockingly engage the upper side portions of the cylindrical portion 48 of mixing bowl 26. An inner depending wall 70 of cap 66 is generally conically shaped and is spaced from the inside cylindrical wall of cylindrical portion 48 so as not to interfere with the flow of liquid and steam around the inner cylindrical wall of the mixing bowls. Inner wall 70 also extends down into the bowl so that its lower edge 72 is closely adjacent but out of engagement with the conical surface of the lower portion 50 so as not to engage the liquid flowing on the inner surface 50. The opposite ends 74 of depending wall 70 are slotted and receive opposite edges of a vertical dividing wall 76 mounted in cap 66. Wall 76 extends from outside the top of the mixing bowl down into the mixing bowl so that its lower edge 78 is closely adjacent to but out of engagement with the inner conical surface 50 of the mixing bowl. Wall 76 is preferably made of an antistatic material to reduce the attraction to it of dry ingredient introduced into the top of the mixing bowl. This helps to reduce the build up of residue of both vapor and the airborne dry ingredient on wall 76. A preferred material for wall 76 is stainless steel, however, any antistatic material acceptable for this environment can be substituted for it.

Figure 4:
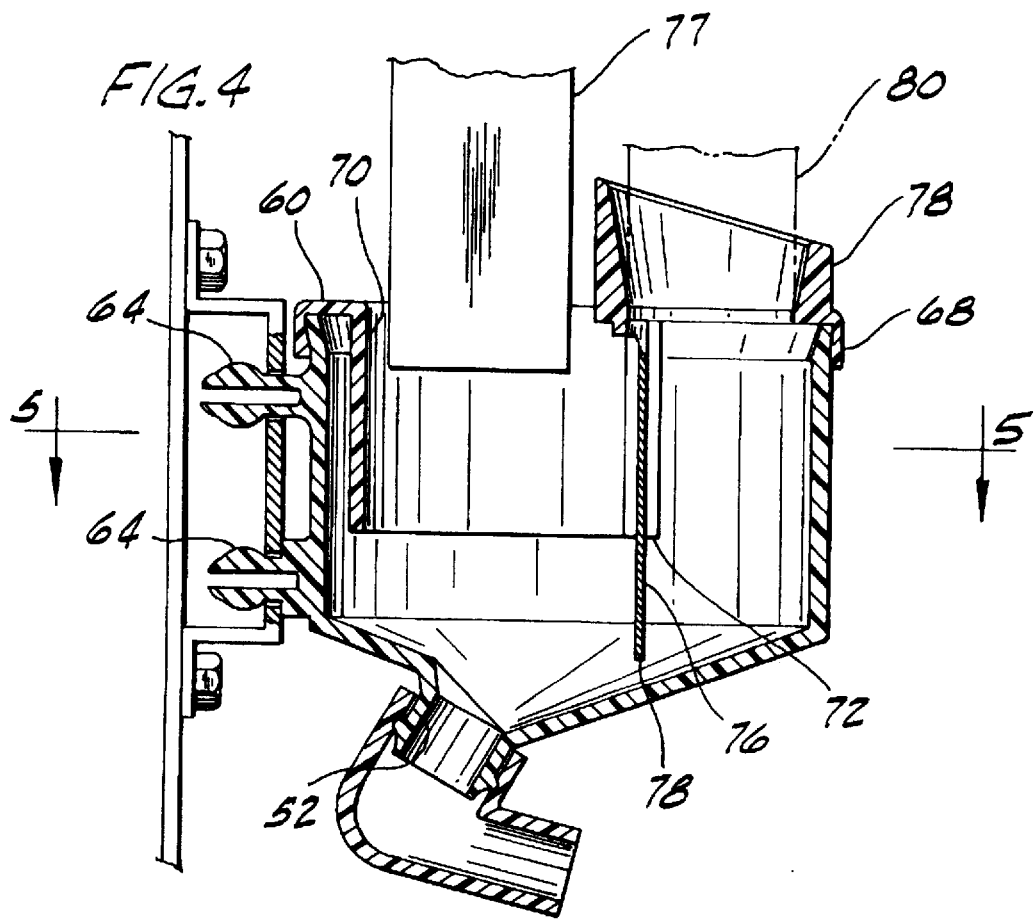
FIG. 4 is a sectional view in the direction of line 4—4 of FIG. 3.

Wall 76 vertically divides the mixing bowl into first and second sections. The first section of the bowl is open to atmosphere at the top through the cap 66. Dry ingredient from any of the canisters can be dropped into the mixing bowl positioned directly below, such as by a delivery tube 77, as shown in FIG. 4, it so that the measured amount of ingredient can mix with liquid swirling in the lower conical portion 50 of the respective mixing bowl. The second section of the mixing bowl formed by divider wall 76 is closed off at its upper portion so as not to be open to atmosphere. A cylindrical opening 78 is provided into which is positioned a suction tube 80 for causing a suction in the mixing bowl so as to draw dry ingredient and vapor from the first section of the mixing bowl, which is open to atmosphere, and remove it from the second section during mixing. Tube 80 is connected to a suction device as such as fan 82 as described below, to provide the suction thereon.

Figure 6:
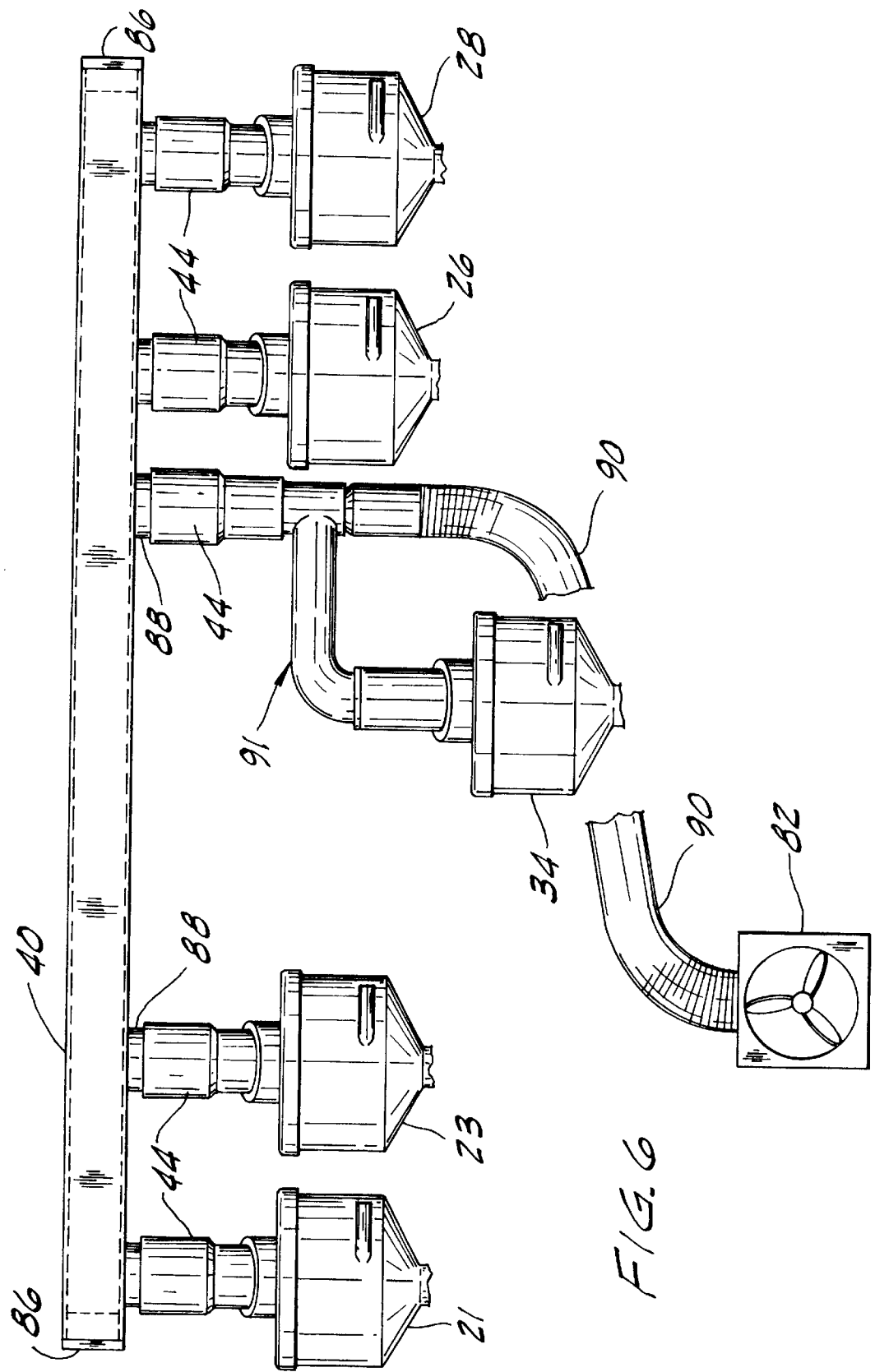
FIG. 6 is a front elevational view of the moisture reduction system of the preferred embodiment.

The preferred embodiment of the moisture reduction apparatus of the present invention, in addition to the above described mixing bowls, includes the horizontal manifold 40 mounted inside the vending machine above the mixing bowls for easy access and cleaning. As shown in FIG. 6, manifold 40 is preferably provided with end caps 86 which can be removed so that the manifold can be readily cleaned on the inside with a bristle brush or the like. Each of the suction tubes 80 are connected to respective ports 88 of the manifold 40. Suction fan 82 is connected to the manifold 40 by dry ingredient adaptor 91 and suction tube 90 which is also connected to mixing bowl 34 by dry ingredient adaptor 91. This arrangement provides suction to all of the mixing bowls.

As previously mentioned, a liquid overflow outlet is provided in each of the mixing bowls so that if the bowl outlet does become clogged the mixture will not flow out through the opening in the top of caps 66 or into the suction tubes 80. A series of tubes 92 from each overflow outlet are connected to a second manifold (not shown) mounted behind the mixing bowls. This second manifold is provided with an outlet tube 94, shown in FIG. 1, which empties into an overflow container 96 that is removably positioned in the bottom of vending machine 10 so that it can be readily emptied by the serviceman.

Referring now to the operation of the preferred embodiment of the present invention, a customer pays for and makes a selection from the vending machine, for example freeze dried coffee from canister 22, and a predetermined amount of the dry coffee granules are dispensed from the canister in any known manner, such as an auger, into the top of mixing bowl 28 through the opening in the top cap 66 of the mixing bowl. Simultaneously with the dispensing of the dry coffee a predetermined amount of hot water is introduced into the mixing bowl through inlet 56 from a source of hot water (not shown) and as a result of being injected at a tangent to the cylindrical periphery of the inside of the upper portion of the mixing bowl 28 swirls around a portion of the inside upper cylindrical portion 48 and the conical lower portion 50 and entrains the dry coffee dispensed into the bowl. The mixture encounters the baffles 60 and 62 in the cylindrical 48 and conical 50 portions as it swirls about the inside of the mixing bowl which causes further mixing of the dry ingredient with the hot water and disrupts the circulatory flow of the mixture so that it tends to gravity-feed out of the outlet spout 52. This mixture then passes through the tube 84 and into mixing bowl 34 where simultaneously with its introduction through port 58 in the mixing bowl 34 is introduced the selected ingredients from containers 14, 16 and/or 18, such as sugar substitute, creamer or sugar, through the trough 32 and into the opening in the cap 66 of mixing bowl 34. It then is passed to the cup station 12 where it is delivered into a cup positioned therein.

Referring back to the mixing bowl 28, as the water is initially introduced through the inlet 56, and dry ingredient is introduced through the opening in cap 66, suction is produced on the suction tube 80 as a result of operation of fan 82 which runs continuously. The suction on the tube 80 causes a suction in the second section of the mixing bowl which draws vapor and dry ingredient from above the surface of the liquid into the suction tube 80 and into the manifold 40 where it dissipates and/or is deposited. In addition, the suction on the second section of the mixing bowl causes further suction on the first section around the bottom edge of both the inner wall 70 of the top cap 66 and the dividing wall 76. This causes the dry ingredient and vapor from the liquid in the first section of the mixing bowl to be drawn down toward the liquid and into the second section for removal. This movement of the airborne ingredient can cause additional absorption of dry ingredient by the liquid since the airborne material is drawn toward the liquid. This then reduces the amount of airborne ingredient that eventually finds its way to the suction tube 80 and manifold 40, thus reducing the amount which has to be manually cleaned from the system during servicing.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. An ingredient mixing apparatus for a beverage vending machine, comprising:

an ingredient mixing bowl having an upper portion and a lower portion, the upper portion having a substantially vertical wall formed of a surface of revolution and the lower portion having a generally conically shaped inner wall with an outlet spout;

a divider wall extending into the mixing bowl through the upper and lower portions with side walls extending substantially adjacent the vertical wall of the upper portion, a lower end of the divider wall extending adjacent the conically shaped lower wall so as to substantially divide the bowl into first and second sections without inhibiting the flow of liquid along the conically shaped lower wall;

means for injecting a measured amount of liquid into the mixing bowl so as to cause it to circulate about at least a portion of the conically shaped lower wall before entering the outlet spout;

means for introducing a measured amount of ingredient into the first section of the mixing bowl so as to mix with the liquid in the mixing bowl and exit the outlet spout therewith; and means for causing a suction on the second section of the mixing bowl so as to remove moisture and ingredient laden air from the mixing bowl during mixing of the liquid and ingredient therein.

2. An ingredient mixing apparatus as claimed in claim 1 wherein the divider wall is made of stainless steel.

3. An ingredient mixing apparatus as claimed in claim 1 wherein the divider wall has an antistatic surface in at least the first section.

4. An ingredient mixing apparatus as claimed in claim 1, including a top annular cap on the mixing bowl with a depending wall in the second section adjacent the substantially vertical wall of the mixing bowl and extending in close proximity to but out of engagement with the conically shaped inner wall of the lower portion so as not to interfere with the free flow of liquid thereon, with opposite ends of the depending wall engaging opposite sides of the divider wall.

5. An ingredient mixing apparatus as defined in claim 1, wherein the ingredient laden air is drawn from the first section to the second section of the mixing bowl in close proximity to the surface of the liquid so that at least a portion of the airborne ingredient is absorbed into the liquid.

6. An ingredient mixing apparatus, comprising:

a mixing bowl having a lower portion with an inner surface formed substantially of a surface of revolution and containing an outlet therein;

a substantially vertical divider wall extending into the mixing bowl and having a lower edge in close proximity to the inner surface of the mixing bowl to substantially divide the mixing bowl into first and second sections;

means for introducing an ingredient into the mixing bowl on one side of the divider wall in the first section;

means for injecting liquid into the mixing bowl so as to cause it to swirl about at least a portion of the inner surface of the mixing bowl and mix with the ingredient before exiting through the outlet; and means for causing a suction on the second section of the mixing bowl so as to remove moisture and ingredient laden air from the mixing bowl during mixing of the liquid and ingredient therein.

7. An ingredient mixing apparatus as claimed in claim 6 wherein the divider wall is made of stainless steel.

8. An ingredient mixing apparatus as claimed in claim 6 wherein the divider wall has an antistatic surface in at least the first section.

9. An ingredient mixing apparatus as defined in claim 6 wherein the mixing bowl includes an upper portion having a substantially vertical wall formed of a surface of revolution which engages the inner surface of the lower portion.

10. An ingredient mixing apparatus as defined in claim 6, wherein the ingredient laden air is drawn from the first section to the second section of the mixing bowl in close proximity to the surface of the liquid so that at least a portion of the airborne ingredient is absorbed into the liquid.

11. An ingredient mixing apparatus as claimed in claim 6, including a top annular cap on the mixing bowl with a depending wall in the second section adjacent the substantially vertical wall of the mixing bowl and extending in close proximity to but out of engagement with the conically shaped inner wall of the lower portion so as not to interfere with the free flow of liquid thereon, with opposite ends of the depending wall engaging opposite sides of the divider wall.

12. Moisture reduction apparatus for a liquid vending machine, comprising:

a plurality of ingredient mixing bowls mounted in the vending machine and having an outlet in a lower portion thereof to remove a mixture therefrom, a substantially vertical wall dividing each bowl into first and second sections with an upper portion of the first section being open to atmosphere and an upper portion of the second section being closed to atmosphere;

a suction tube connected to the closed upper portion of the second section of each mixing bowl for withdrawing from the mixing bowl vapor and airborne ingredient;

a manifold horizontally mounted in the vending machine and connected to each suction tube;

a vacuum source connected to the manifold to supply a source of vacuum to the manifold and suction tubes; and an overflow tube connected to the upper portion of the mixing bowl for removing liquid overflow from the bowl if the mixing bowl outlet becomes clogged.

13. A moisture reduction apparatus as defined in claim 12, wherein each mixing bowl has a substantially vertical inner wall in its upper portion formed of a surface of revolution and a lower portion with an inner surface formed substantially of a surface of revolution and containing an outlet therein, and each mixing bowl is provided with a top annular cap with a depending wall in the second section of the mixing bowl adjacent the substantially vertical inner wall of the upper portion of the mixing bowl and extending in close proximity to but out of engagement with the inner surface of the lower portion of the mixing bowl so as not to interfere with the free flow of liquid thereon, with opposite ends of the depending wall engaging opposite sides of the divider wall.

* * * * *